United States Patent
Liberman et al.

(10) Patent No.: US 12,340,416 B2
(45) Date of Patent: *Jun. 24, 2025

(54) ACCELERATED TRADE MATCHING USING SPECULATIVE PARALLEL PROCESSING

(71) Applicant: Chicago Mercantile Exchange Inc., Chicago, IL (US)

(72) Inventors: Stanislav Liberman, Vernon Hills, IL (US); Michael Colligan, Chicago, IL (US); James Raitsev, Arlington Heights, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 505 days.

This patent is subject to a terminal disclaimer.

(21) Appl. No.: 17/853,225

(22) Filed: Jun. 29, 2022

(65) Prior Publication Data
US 2022/0327623 A1    Oct. 13, 2022

Related U.S. Application Data

(63) Continuation of application No. 14/486,585, filed on Sep. 15, 2014, now Pat. No. 11,410,231, which is a
(Continued)

(51) Int. Cl.
*G06Q 40/04*    (2012.01)
*G06Q 40/06*    (2012.01)

(52) U.S. Cl.
CPC ............. *G06Q 40/04* (2013.01); *G06Q 40/06* (2013.01)

(58) Field of Classification Search
CPC ......... G06Q 40/04; G06Q 40/06; G06Q 40/00
See application file for complete search history.

(56) References Cited

U.S. PATENT DOCUMENTS

| 5,945,653 A | 8/1999 | Walker et al. |
| 7,039,610 B2 * | 5/2006 | Morano ................. G06Q 40/10 |
| | | 705/37 |

(Continued)

OTHER PUBLICATIONS

Dorn et al., "Correlated Trading and Returns", Sep. 21, 2007, pp. 1-58.
(Continued)

*Primary Examiner* — Hao Fu
(74) *Attorney, Agent, or Firm* — Lempia Summerfield Katz LLC (57) ABSTRACT

An electronic trading system is configured to create speculative orders based on real orders. The speculative order differs from the real order by the price, quantity, or the type of financial instrument. The match engine chooses one or more speculative orders in an attempt to predict the next real order. Even though processing multiple trades at the same time is impossible, the use of speculative orders can permit the match engine to perform the calculations involved with the trade and generate the messages associated with the trade ahead of time. If the prediction was correct and the next order received by the match engine corresponds to one of the speculative orders, some of the matching activity has already been performed. This in effect, allows the match engine to process trades more efficiently and increases the total trading volume that can be handled by the electronic trading system.

20 Claims, 5 Drawing Sheets

Related U.S. Application Data continuation of application No. 12/560,185, filed on Sep. 15, 2009, now Pat. No. 8,868,460.

(56) References Cited

U.S. PATENT DOCUMENTS

| | | |
|---|---|---|
| 7,496,531 B1 | 2/2009 | Gastineau et al. |
| 7,685,052 B2 | 3/2010 | Waelbroeck et al. |
| 7,742,974 B2 | 6/2010 | Owens et al. |
| 7,797,226 B2 | 9/2010 | Ram et al. |
| 7,856,395 B2 | 12/2010 | Jackson et al. |
| 7,930,233 B2 | 4/2011 | Owens et al. |
| 2002/0018074 A1 | 2/2002 | Buil et al. |
| 2002/0087454 A1 | 7/2002 | Calo et al. |
| 2003/0009411 A1 | 1/2003 | Ram et al. |
| 2003/0069830 A1 | 4/2003 | Morano |
| 2003/0233309 A1 | 12/2003 | Matus et al. |
| 2003/0236738 A1 | 12/2003 | Lange et al. |
| 2004/0039663 A1 | 2/2004 | Kernz |
| 2005/0165668 A1 | 7/2005 | Hinkle |
| 2005/0187866 A1 | 8/2005 | Lee |
| 2006/0069635 A1 | 3/2006 | Ram et al. |
| 2006/0149660 A1 | 7/2006 | Morano et al. |
| 2006/0161498 A1 | 7/2006 | Morano et al. |
| 2006/0259394 A1 | 11/2006 | Cushing et al. |
| 2007/0016506 A1 | 1/2007 | Davies et al. |
| 2007/0214045 A1 | 9/2007 | Subramanian et al. |
| 2008/0059382 A1 | 3/2008 | Burczyk |
| 2008/0116264 A1 | 5/2008 | Hammad et al. |
| 2008/0133402 A1 | 6/2008 | Kurian et al. |
| 2008/0208778 A1 | 8/2008 | Sayyar-Rodsari et al. |
| 2008/0270246 A1 | 10/2008 | Chen |
| 2008/0313095 A1 | 12/2008 | Shalen |
| 2009/0076982 A1 | 3/2009 | Ginberg et al. |
| 2009/0313161 A1 | 12/2009 | McAllister et al. |
| 2009/0314840 A1 | 12/2009 | Granucci et al. |
| 2009/0319070 A1 | 12/2009 | Morningred et al. |
| 2009/0327153 A1 | 12/2009 | Milne |
| 2010/0017323 A1 | 1/2010 | Zimmerman |
| 2010/0036763 A1 | 2/2010 | Driscoll |
| 2010/0082500 A1 | 4/2010 | Utnick et al. |
| 2010/0205113 A1 | 8/2010 | Bauerschmidt et al. |
| 2010/0268663 A1 | 10/2010 | Asplund |
| 2011/0040667 A1 | 2/2011 | Montesano et al. |
| 2011/0040668 A1 | 2/2011 | Lee et al. |
| 2011/0055067 A1 | 3/2011 | Milne et al. |

OTHER PUBLICATIONS

International Search Report in related PCT Application No. PCT/US2010/048643, Oct. 25, 2010.

Michael David Smith, "Support for Speculative Execution in High-Performance Processors. A Dissertation submitted to the Dept. of Electrical Engrg and the Committee of Graduate Studies of Stanford University in partial fulfillment of the requirements of the degree of Doctor of Philosophy", Nov. 1992, pp. 1-141.

Patent Examination Report, from related Australian Application No. 2010295789, Mar. 8, 2013.

Webpage, "Speculative Execution", available from http://en.wikipedia.org/wiki/Speculative_exeuction, 3 pages, available as early as Jan. 11, 2012.

* cited by examiner

ACCELERATED TRADE MATCHING USING SPECULATIVE PARALLEL PROCESSING

REFERENCE TO RELATED APPLICATIONS

This application claims priority to, and the benefit as a continuation under 37 C.F.R. 1.53 (b) of U.S. patent application Ser. No. 14/486,585, filed Sep. 15, 2014, now U.S. Pat. No. 11,410,231, which claims priority to, and the benefit as a continuation under 37 C.F.R. 1.53 (b) of U.S. patent application Ser. No. 12/560,185 filed Sep. 15, 2009, now U.S. Pat. No. 8,868,460, the entirety of all of which are incorporated by reference herein and relied upon.

TECHNICAL FIELD

The present invention relates to software, systems, and methods for electronic trading in a commodities exchange, derivatives exchange or similar business involving tradable items where orders from buyers are matched with orders from sellers.

BACKGROUND

Electronic trading systems accept bids and offers in the form of orders, which are also referred to as real orders because they consist of data entered by traders either directly or by computing devices under their control. Based on the nature of the exchange, electronic trading systems generally perform matching using the following procedure. First, a new request is received. The request may be an order, an order modification, or an order cancellation. Second, the new request is evaluated against the existing order book and matching is performed, if possible. Third, once processing has been finished, messages are sent out to notify the marketplace of the actions performed, which updates the current state of the market. Finally, the electronic trading system checks to see if there is any quantity remaining to be rested on the order book.

This sequence is mandated by the business rules used by electronic trading systems to ensure market integrity. It is a requirement that orders be matched in a one-at-a-time serialized manner.

Of these steps or sequence, the preparation and communication of messages has been found to require the great amount of processing time. For example, messages corresponding to each of the executed trades need to be built and sent out. Since traders need to be able to respond to the events generated, these actions must be completely executed before processing of the next request can begin.

Exchanges that host electronic trading systems using match engines are constantly striving to shorten their response time and thus increase the number of matches performed per unit of time. At some point, performance optimizations options based upon the single threaded matching logic and code will be exhausted. A need for a fundamental architectural change arises.

What is needed is an approach that could significantly improve the performance of order matching, especially at peak times, when a burst of orders is received by the trading engine.

DETAILED DESCRIPTION OF THE DRAWINGS AND PRESENTLY PREFERRED EMBODIMENTS

When a real order is received at a price level, a match engine calculates tradable combinations involving the real order. A matched order is calculated from the tradable combinations according to a matching algorithm. After the order matching activity is finished, the state of the order book may be determined.

The nature of the business of electronic trading system is that a transparent marketplace must be maintained. When trading entities send in orders, they expect that the orders will be matched against the market that they can see on the order books made available to the public. The exchange may publish allocation algorithms that set forth how trades are filled. For example, a first in first out (FIFO) algorithm, a proration per quantity algorithm, or a market maker priority algorithm may be used depending on the market.

In any case, multiple trades executing for the same type of financial instrument at the same time is impossible. Orders must be processed one at a time. Consequently, the electronic trading system cannot take advantage of some technologies that increase computational power using parallel processing or distributed computing.

However, multiple parallel processing threads may be launched by one or more match engines to calculate possible future matched trades involving speculative orders. The speculative orders may be based on varying the price levels of real orders or by changing other criteria of real orders, such as quantity or the type of instrument. In choosing the speculative orders, the match engine may select prices randomly or attempt to predict conditions in the future based on current market conditions.

If the next order (or a subsequent order) received by the match engine is for the same criteria as would be used for one of the speculative orders, some of the matching activity has already been performed. This in effect, allows parallel matching, but the results are emitted only based on the actual incoming received orders. The new order can be instantaneously traded when it matches a speculative order.

Therefore, in a scenario where the next order matches one of these pre-calculated and pre-generated trades, the time required to send out the messaging for these trades would be reduced and potentially faster order response times could be achieved. Further, the power of parallel processing may be utilized, while guaranteeing that responses are sent in the proper order with respect to the sequence in which the requests were received.

Figure 1:
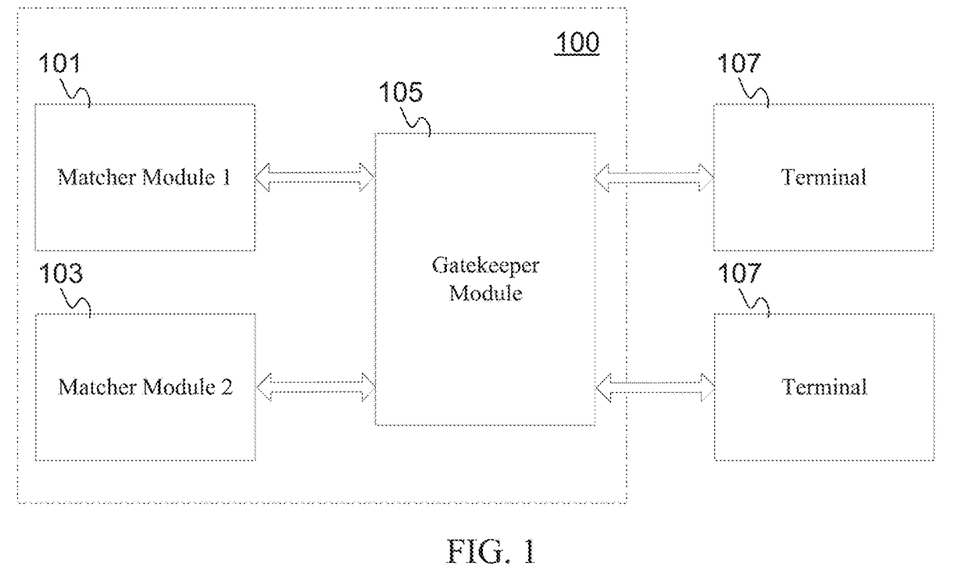
FIG. 1 illustrates a block diagram of an electronic trading system.

FIG. 1 illustrates a block diagram of an electronic trading system. The electronic trading system includes a match engine 100 coupled with terminals 107. The match engine 100 includes a gatekeeper module 105, a first matcher module 101, and a second matcher module 103. The first matcher module 101 operates independently of the second matcher module 103. The first matcher module 101 may be assigned tasks associated with a real order received from one of the terminals 107, and the second matcher module 103 may be assigned tasks associated with a speculative order. As used herein, the phrase "coupled with" is defined to mean directly connected to or indirectly connected through one or more intermediate components. Such intermediate components may include both hardware and software based components.

The match engine 100 may be implemented as a hardware or software. Match engine 100 may include one or more computers including at least a memory, a communication interface, and a processor. Alternatively, the match engine 100 may be implemented as a combination of hardware and software. The market data server may be implemented with hardware or software as part of the match engine 100. Alternatively, the market data server may be a database or computer coupled with match engine 100.

Terminals 107 may include a memory, an interface, a processor, and operating firmware/software that perform functions, such as receiving input from a user, generating, and transmitting instructions to place a request or order and receiving a response to those instructions. Terminal 107 may be a conventional computer, a hybrid personal computer, a personal digital assistant (PDA), a laptop computer, a mobile telephone or any other device that can receive and send information through a communication link. Terminal 107 may also include a display device, a keyboard, a mouse, a touch panel, a graphical user interface (GUI), a printer, a scanner, and/or other input/output devices associated with a computer for interacting with a user of the terminal 107. In one embodiment, terminal 107 is a personal computer having a Pentium class processor, a suitable memory, hard disk and user interface and a network interface.

Real orders may be entered for any tradable financial instrument available on the exchange. For example, the real order may be a bid or offer for any listed futures contracts, options, inter-commodity spreads, intra-commodity spreads, futures strips, calendar spreads, butterfly spreads, condor spreads, crack spreads, straddles, and strangles.

An order (or message based on the order) is sent by a market participant by way of terminals 107 to match engine 100. The gatekeeper module 105 receives the incoming order and determines what actions are to be taken. The gatekeeper module 105 launches one or more of the matcher modules 101 and 103 as necessary. The first matcher module 101 is configured to perform the calculations related to the trades and generation of the outgoing messages and updates based on the real order and the current known state of the order book. The second matcher module 103 is configured to perform the calculations related to the trades and generation of the outgoing messages and updates based on the speculative order. In addition, the second matcher module 103 may be configured to perform the calculations and generate the outgoing messages based on the state of the order book that is known to occur when the real order has cleared.

The outgoing messages may include a variety of different types of messages. For example, messages may be sent to the two or more trading entities. These messages include the order, the price of the order, and optionally the parties of the trade. A message may be sent to the clearing portion of the exchange. This message includes the order, the price of the order, and the trading entities. Messages may be sent to a market data server to notify everyone in the marketplace that a trade occurred at this price and quantity for this financial instrument. The market data server may be coupled with terminals 107 to publish market data to the marketplace.

The speculative order may be based on the most recent real order. For example, the speculative order may be for the same financial instrument and same quantity as the real order but at a price one tick higher or lower than the real order. A tick is the minimum amount, established by the exchange or otherwise configured in the electronic trading system that a price of a financial instrument may fluctuate in either direction.

Match engine 100 may determine the price of the speculative order based on a variety of factors: a current market trend, an overall market trend, an economic indicator, a scheduled market event or a financial announcement.

The trend of the current market of the financial instrument may provide a good indication of where the market will go in the immediate future. For example, in some markets, a day of falling prices probably reasonably predicts that prices will continue to fall at least for the short run. In this case, match engine 100 may determine that the speculative order is priced one or more ticks below the most recent real order.

More specifically, a statistical analysis based on the analysis of the price distribution for the financial instrument may be used. For example, the average price over a time window. The time window may be daily, weekly, yearly or any other period of time. Alternatively, the standard deviation of the price over a time window may be used.

The overall market trend may provide a good indication of the direction of the market for an individual financial instrument in the immediate future. This may especially be true for financial instruments that have a small trading volume. The match engine 100 may determine that the speculative order is priced to follow the general trend of the overall market.

Economic indicators may also give clues to the future prices of a financial instrument. Economic indicators include unemployment rates, interest rates, and indices related to a particular market sector.

A scheduled market event or financial announcement may be used by match engine 100 to determine the price of the speculative order. A listing and schedule of market events is presently published by CME Group at http://www.cme-group.com/tools-information/calendars/index.html. Financial announcements may include federal rate announcement, release of unemployment numbers, inventory announcement, as well as other announcements.

In another embodiment, match engine 100 may define the speculative order by varying quantity or the type of financial instruments according to any one or more of the above factors. This can be done in additionally or alternatively to the price of the speculative order.

The match engine 100 may employ any number of matchers to perform calculations and generate trades based on speculative orders. In one example, match engine 100 includes eleven matcher modules. One matcher module performs the calculations and generates the messages involved with the real order. The match engine 100 assigns prices to ten speculative orders from five ticks below to five ticks above the price of the real order. Each of the other ten matchers performs the calculations and generates the messages involved with one of the ten speculative orders.

In another embodiment, the match engine 100 may decide how many matchers to use based on a current market trend, an overall market trend, an economic indicator, a scheduled market event or a financial announcement. For example, when federal rate change announcement occurs, there is a general spike in activity, the computing resources that are normally dedicated to speculative orders may be better allocated to the calculation of real market data.

FIG. 1 illustrates match engine 100 comprising gatekeeper module 105, matcher 101 and matcher 103. Other embodiments may take advantage of parallel processing in which the various calculations may be carried simultaneously. Examples of systems that may employ parallel processing include a grid computing network, a cloud computing network, and a symmetric multiprocessing (SMP) computer architecture. In all examples, the function of gatekeeper 105 may be performed by one or more of the match engines or by a centralized gatekeeper processor in the electronic trading system.

Figure 2:
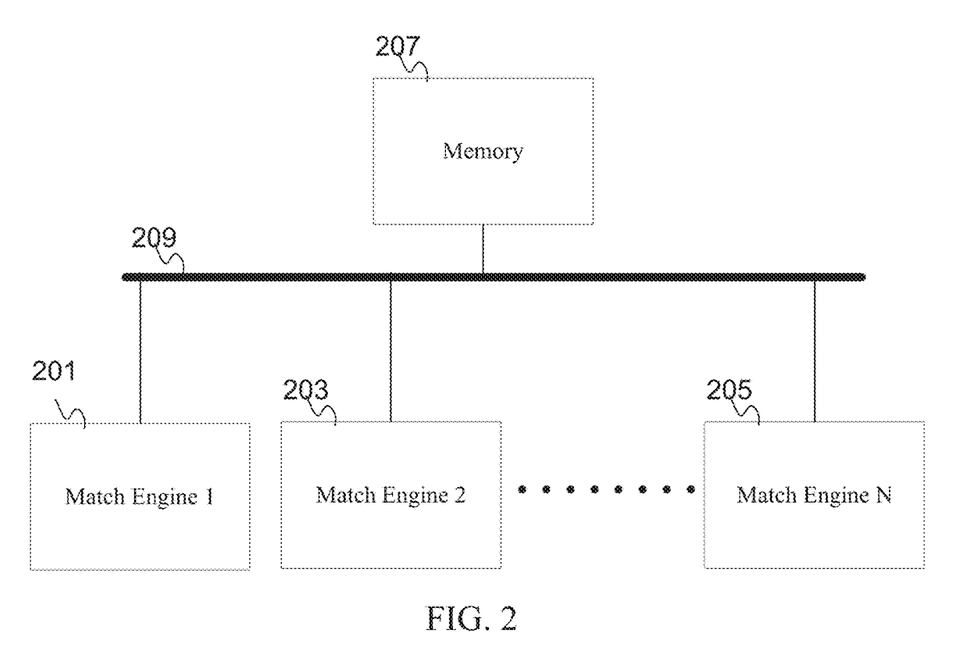
FIG. 2 illustrates a symmetric multiprocessing implementation of a portion of the electronic trading system of FIG. 1.

FIG. 2 illustrates an SMP implementation of a portion of the electronic trading system of FIG. 1. A series of any number of match engine processors including a first match engine processor 201, a second match engine processor 203, to an Nth match engine processor 205 may be connected to a single shared memory 207 via bus 209. The SMP computer architecture allows any of the processors to work on any task no matter where the data is located in memory 207. This is particularly suited for the parallel processing of speculative order because each matcher will require access to the order book for the financial instrument.

Figure 3:
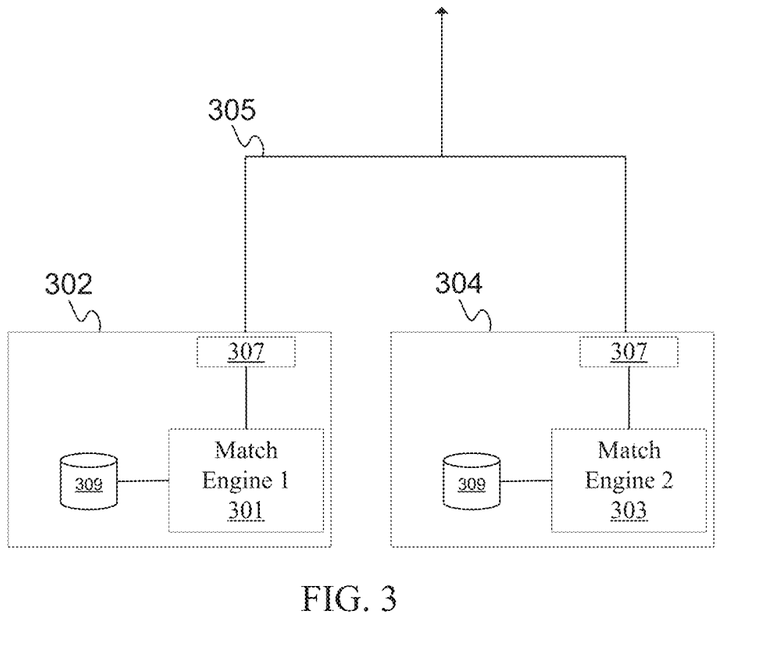
FIG. 3 illustrates a grid computing implementation of a portion of the electronic trading system of FIG. 1.

FIG. 3 illustrates a grid computing implementation of a portion of the electronic trading system of FIG. 1. Grid computing involves the collaboration of computing resources from various domains applied to a common task. A first computer 302 includes a first match engine processor 301, a network communication device 307 and a storage element 309. A second computer 304 includes a second match engine processor 303, a network communication device 307 and a storage element 309. Computers 302 and 304 are coupled by a network 305 such as Ethernet or the Internet. Storage element 309 may include both a permanent storage database and a random access memory. In one embodiment of the grid computing implementation, the first match engine processor 301 and the second match engine processor 303 may be responsible only for generating messages, while order matching is handled at a centralized point at the electronic trading system.

Figure 4:
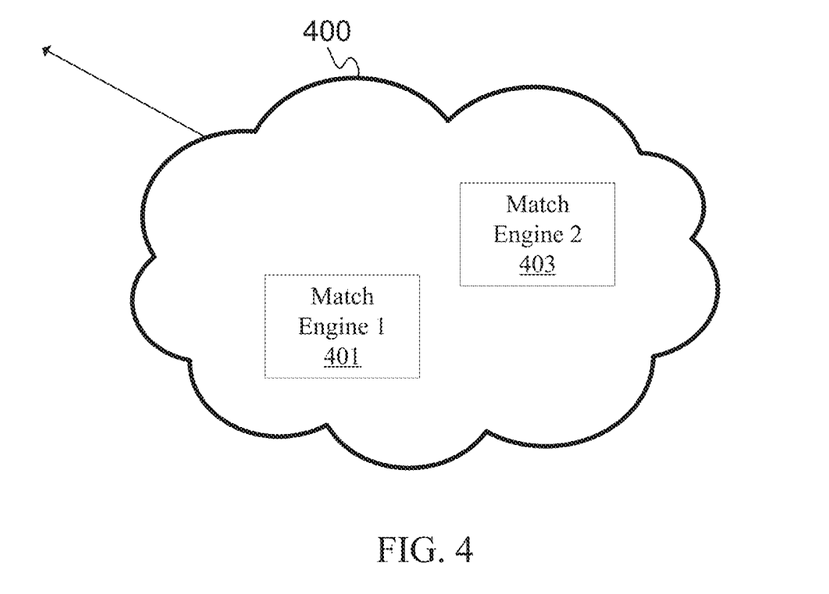
FIG. 4 illustrates a cloud computing implementation of a portion of the electronic trading system of FIG. 1.

FIG. 4 illustrates a cloud computing implementation of a portion of the electronic trading system of FIG. 1. Cloud computing is a system in which computing resources are provided over the Internet. The computing resources may be purchased from a third party on the basis of usage, which avoids the high capital costs associated with a computer infrastructure. Cloud computing system 400 may include a first match engine processor 401 and a second match engine processor 403. In one embodiment of the cloud computing implementation, the first match engine processor 401 and the second match engine processor 403 may be responsible only for generating messages, while order matching is handled at a centralized point in the electronic trading system.

Figure 5:
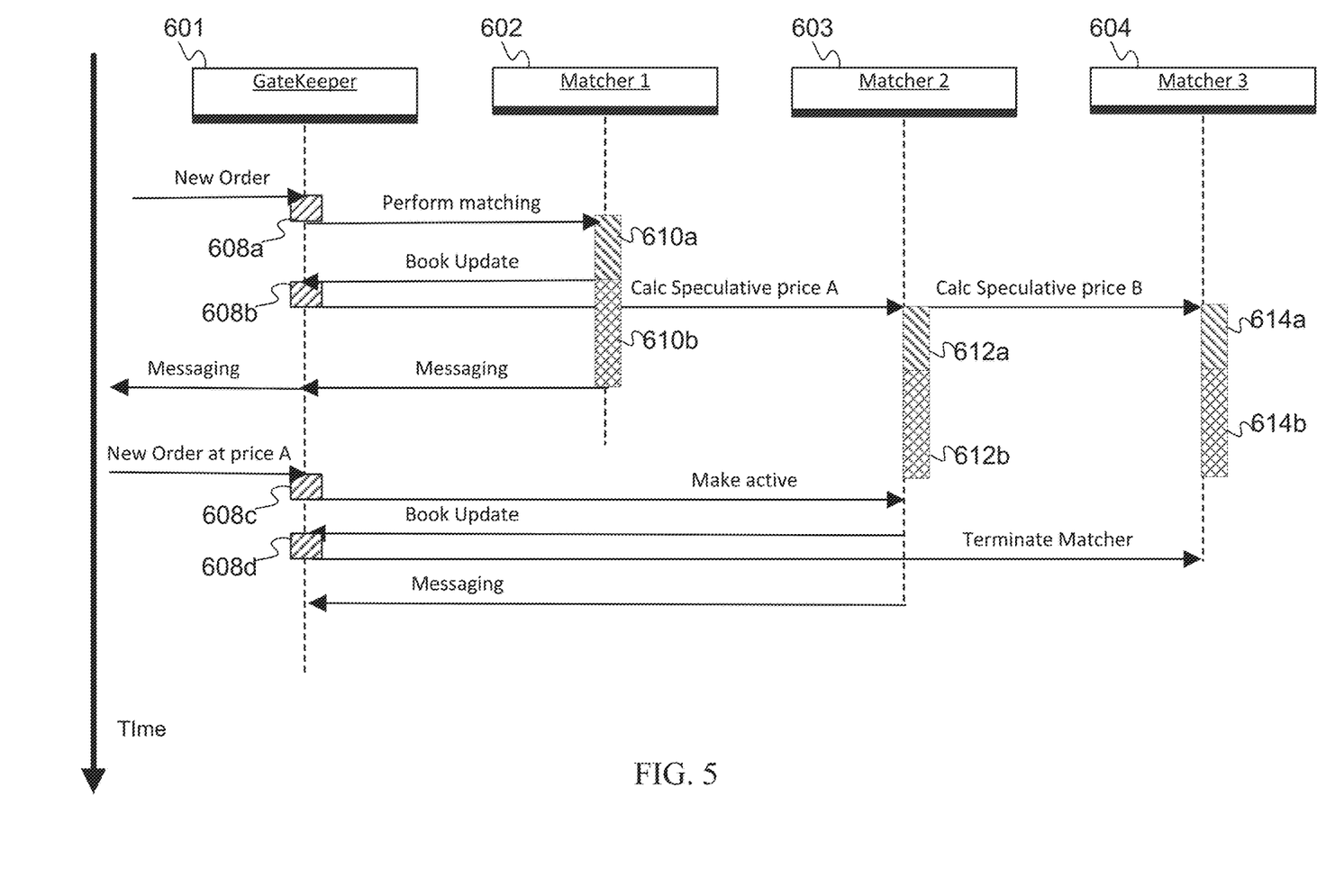
FIG. 5 illustrates a timing diagram of accelerated trade matching using speculative parallel processing.

FIG. 5 illustrates a timing diagram of accelerated trade matching using speculative parallel processing. The horizontal axis includes the processors or modules involved in speculative parallel processing, including the gatekeeper processor 601, first match engine processor (matcher 1) 602, second match engine processor (matcher 2) 603, and third match engine processor (matcher 3) 604. Time is measured by the vertical axis.

Processing blocks 608a-d, 610a-b, 612a-b, and 614a-b illustrate the processing time required for various tasks by the processors or modules. Although not to scale, the relative size of Processing blocks 608a-d, 610a-b, 612a-b, and 614a-b indicates how much time is required.

When a new real order comes in, gatekeeper processor 601 requires a relatively small amount of time, processing block 608a, to process the real order and assign it to match engine processor 602. Match engine processor 602 requires a relatively large amount of time, processing blocks 610a and 610b, to perform the calculations related to the trades and generation of the outgoing messages and updates based on the real order.

Processing block 610a corresponds to the calculations related to the trade, and processing block 610b corresponds to the generation of the outgoing messages. As soon as the calculations related to the trade are finished, the gatekeeper 601 may update the order book, as shown by processing block 608b. When the order book is updated, the match engine has all the information necessary to begin working possible future trades. Accordingly, at that time gatekeeper processor 601 can assign a speculative order (Price A) to the second match engine processor 603.

The second match engine processor 603 begins on the calculations related to the speculative order, as shown by processing block 612a. Depending on the timing, the second match engine processor 603 may also complete the generation of the outgoing messages related to the speculative order, as shown by processing block 612b.

By this time, the first match engine processor 602 has completed generation of the outgoing messages and updates based on the real order, as shown by processing block 610b. If a new order comes in at price A, only the relatively small amount of processing, as shown by processing block 608c, is needed because the second match engine 603 has already performed the calculations related to the speculative order at price A and generation of the outgoing messages and updates based on the speculative order. The new order can be instantaneously traded when it matches a speculative order.

At the same time that the gatekeeper processor 601 assigned speculative order at price A to the second match engine processor 603, gatekeeper processor 601 may also assign a second speculative order at price B to third match engine processor 604. Third match engine processor 604 is configured to perform the calculations related to the second speculative order, as shown by processing block 614a, and generate the outgoing messages related to the second speculative order, as shown by processing block 614b.

If a real order at price B is the next order received by gatekeeper processor 601, then the third match engine processor 604 would process it because it has already begun processing based on the second speculative order. However, in the case shown by FIG. 5, the next real order was at price A. The gatekeeper processor 601 will decide, as shown by processing block 608d, to terminate the processing performed by the third match engine 604.

In one embodiment, the calculations and messages based on the speculative orders will be save for predetermined time, or indefinitely, in a storage element, such as storage element 309. When a new order that corresponds to the speculative order is received, some or all of the calculations and messages may be used based on the state of the order book at that time.

Figure 6:
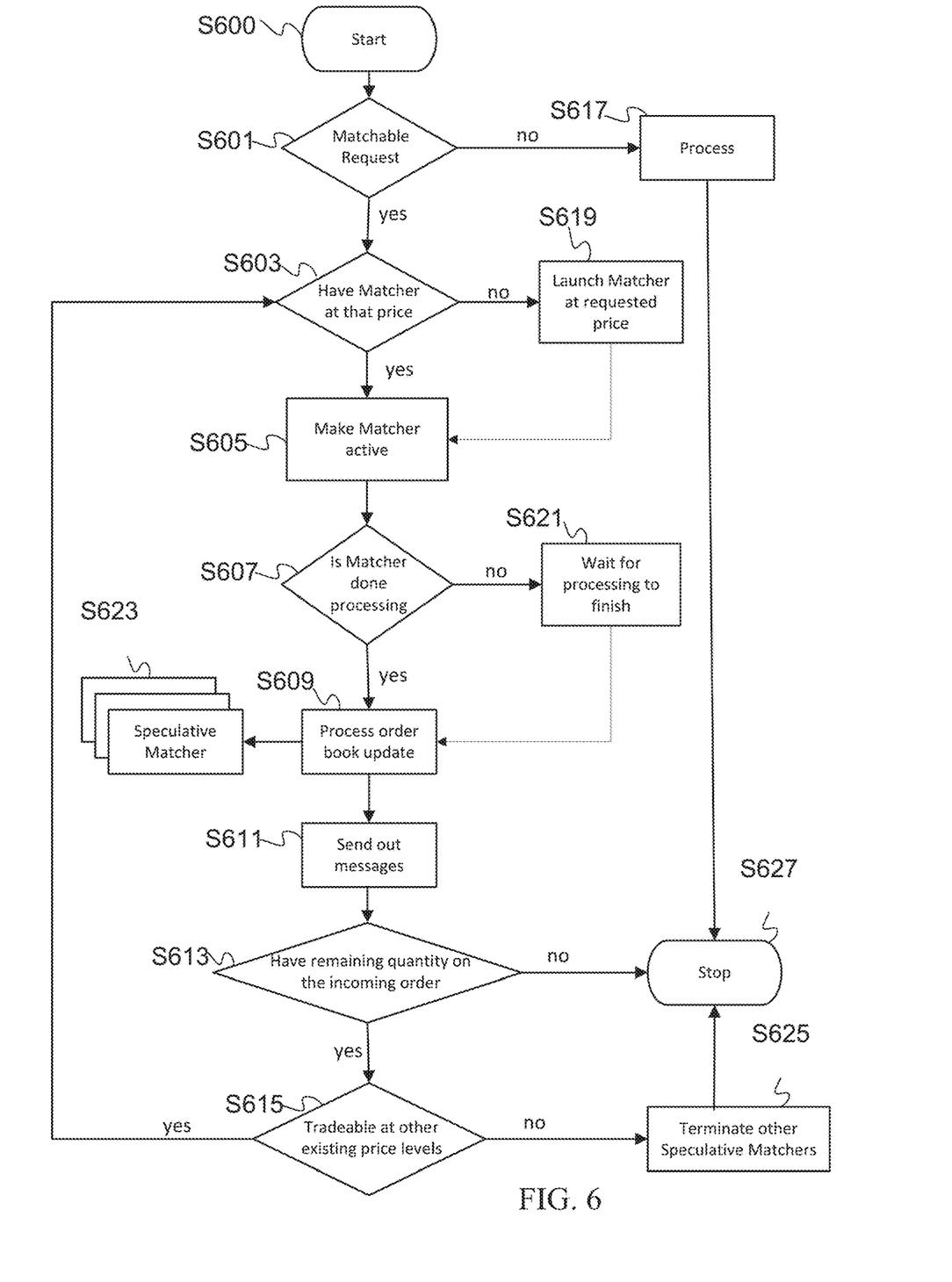
FIG. 6 illustrates a flow chart of one embodiment of accelerated trade matching using speculative parallel processing.

FIG. 6 illustrates a flow chart of one embodiment of accelerated trade matching using speculative parallel processing. The process begins at block S600. At S601, the match engine 100 or a validation module (not shown) validates a received request or order. The validation determines whether the request can be handled by the match engine 100. For example, match engine may not be capable of handling some quantities or some financial instruments, if such an order or request is received, it is processed at S617, and a message is returned to the requesting terminal or trading entity.

Otherwise, match engine 100 determines whether a matcher has already performed calculations based on a speculative order that corresponds to the received order at S603. If not, block S619 indicates that a matcher will be launched at the price. If so, the matcher that performed calculations for the speculative order is made active at S605. At block S607, gatekeeper 601 determines whether the matcher is already done processing. If not, the system waits at block S621. If so, the order is immediately processed, and the order book is updated at S609. As the order book is updated, new speculative orders may be assigned to the matchers at S623 so that processing may begin on the next order to be received. Outgoing messages are generated and sent out at block S611.

At block S613, match engine 100 determines whether there is remaining quantity in the incoming order. If not, the process stops at S627. If so, the match engine 100 determines, at block S615, if there are other orders on the book at other price levels that can trade with the incoming order. If not, the matchers at all price levels are terminated at block S625 and the process ends. If so, the process returns to block S603 and repeats at the other price levels according to one of the allocation algorithms above.

Figure 7:
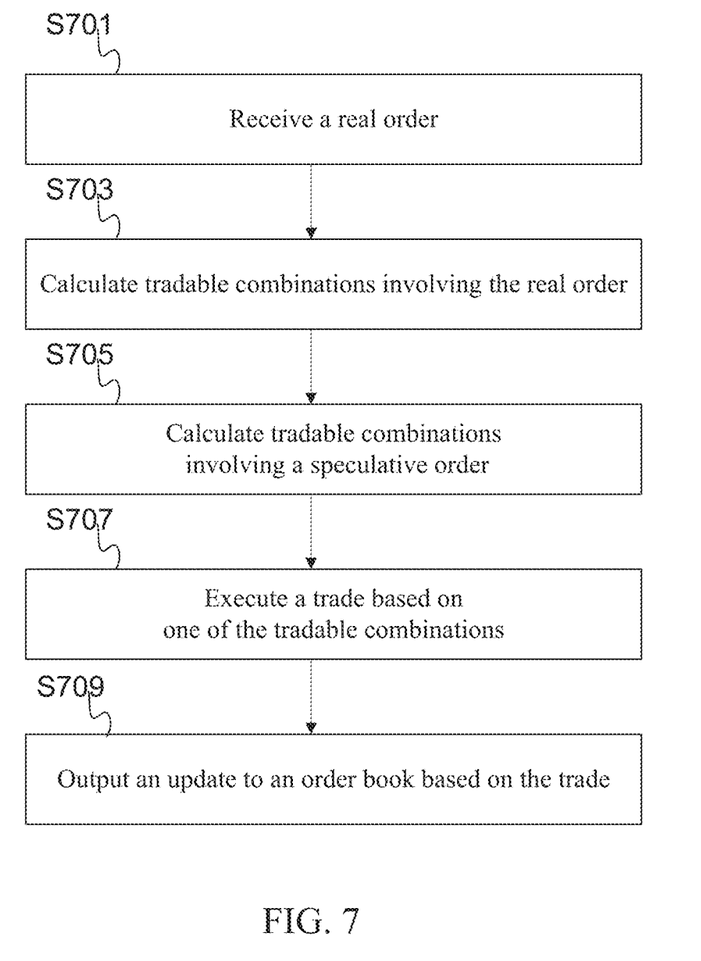
FIG. 7 illustrates another embodiment of accelerated trade matching using speculative parallel processing.

FIG. 7 illustrates another embodiment of accelerated trade matching using speculative parallel processing. At block S701, match engine 100 or gatekeeper module 105 receives a real order. At block S703, the first match engine processor 101 calculates tradable combinations involving the real order. At block S705, a second match engine processor 103 calculates tradable combinations involving at least one speculative order. At block S707, match engine 100 executes a trade based on at least one of the tradable combinations involving the real order or at least one of the tradable combinations involving the at least one speculative order. At block S709, match engine 100 outputs an update to an order book based on the trade.

The disclosed embodiments, including match engine 100, describe a system capable of receiving bids and offers and otherwise managing the execution of trades in a marketplace, such as those provided by Chicago Mercantile Exchange Inc., (CME Group) located in Chicago, Ill. However, the embodiments disclosed herein are applicable to any trading or futures market in the United States or elsewhere in the world, for example, the Chicago Board of Trade (CBOT), the Bolsa de Mercadorias e Futoros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

The steps, elements and processes discussed herein may be encoded as program logic, computer readable code and/or instructions. These encoded elements, in turn, may be stored or embedded on a computer readable medium such as, for example, a hard disk drive, a solid state drive or other storage medium. The computer readable medium may be in communication with a processor which, in response to an appropriate input or command, may execute the program logic stored on the computer readable medium. The execution of this program logic may result in the execution of the step, elements and processes embodied and discussed herein.

It should be understood that various changes and modifications to the presently preferred embodiments described herein will be apparent to those skilled in the art. Such changes and modifications can be made without departing from the teachings of the present invention and without diminishing its intended advantages. It is therefore intended that such changes and modifications be covered by the appended claims.

We claim:

1. A computer implemented method comprising:
receiving, prior to a first matching engine processor of an electronic trading system, from an input terminal via a communications network, by a gatekeeper processor coupled therewith and disposed between the input terminal and the first matching engine processor, data indicative of a first real order for a financial instrument;
generating, by the gatekeeper processor, responsive to a determination by the gatekeeper processor that the first real order has not been filled by one or more previously received but unfilled orders counter thereto, a plurality of speculative orders which corresponds to at least one other real order that is counter to the first real order and which is predicted to be, but not yet, received;
dynamically implementing, by the gatekeeper processor based on the generating, at least one of a plurality of additional matching engine processors, wherein each of the plurality of additional matching engine processors operate in parallel and correspond to one of the plurality of speculative orders;
causing, by the gatekeeper processor, based on the corresponding one of the plurality of speculative orders, at least one of the plurality of additional matching engine processors to perform at least a portion of calculations involved with matching the first real order with a yet-to-be received corresponding at least one other real order, as if it had been received, and generate a plurality of outgoing electronic messages associated therewith;
preventing, by the gatekeeper processor, each of the calculations and generated plurality of outgoing electronic messages from being utilized to execute a trade until another real order corresponding to one of the plurality of speculative orders is received by the gatekeeper processor;
receiving, by the gatekeeper processor prior to the first matching engine processor, via the communications network subsequent to at least the generating of the one of the plurality of speculative orders which corresponds thereto, data indicative of a second real order corresponding to one of the plurality of speculative orders; and
bypassing the first matching engine processor and executing, by the gatekeeper processor, a trade based on the second real order and the first real order, the executing comprising utilizing the calculations and transmitting, via the communications network, the plurality of outgoing electronic messages previously generated by the additional matching engine processor corresponding to the one of the plurality of speculative orders.

2. The computer implemented method of claim 1, further comprising:
determining, by the gatekeeper processor, a price of each of the plurality of speculative orders based on a price of the first real order.

3. The computer implemented method of claim 2, wherein the price of each of the plurality of speculative orders differs from the price of the first real order by a multiple of price ticks.

4. The computer implemented method of claim 1, further comprising:
determining, by the gatekeeper processor, a price of each of the plurality of speculative orders based on a trend of a market or a trend of a financial instrument underlying the first real order, based on economic indicators, based on a statistical analysis, or based on a scheduled market event or a financial announcement.

5. The computer implemented method of claim 1, wherein one of the plurality of speculative orders differs from another of the plurality of speculative orders by price, quantity and/or type of instrument, each corresponding to potential variation of a real order counter to the first real order which may possibly be received.

6. The computer implemented method of claim 5, wherein the differences between each of the plurality of speculative orders are randomly determined.

7. The computer implemented method of claim 1 wherein a number of the plurality of speculative orders generated is based on when the second real order is received subsequent to receipt of the first real order.

8. The computer implemented method of claim 1, wherein the plurality of outgoing electronic messages includes messages addressed to at least one trading entity, to an exchange or to a market data server.

9. An electronic trading system comprising:
a gatekeeper processor disposed between an input terminal and a first matching engine processor; and
a non-transitory memory coupled with the gatekeeper processor, the non-transitory memory storing computer executable instructions to cause the gatekeeper processor to:
receive, prior to a first matching engine processor of the electronic trading system, from the input terminal via a communications network, data indicative of a first real order for a financial instrument;
generate responsive to a determination that the first real order has not been filled by one or more previously received but unfilled orders, a plurality of speculative orders which corresponds to at least one other real order that is counter to the first real order and which is predicted to be, but not yet, received;
dynamically implement, based on the generation, at least one of a plurality of additional matching engine processors, wherein each of the plurality of additional matching engine processors operate in parallel and correspond to one of the plurality of speculative orders;
cause the plurality of additional matching engine processors to perform, based on the corresponding one of the plurality of speculative orders, at least a portion of calculations involved with matching the first real order with a yet-to-be received corresponding at least one other real order, as if it had been received, and generate a plurality of outgoing electronic messages associated therewith;
prevent the first matching engine processor from utilizing each of the calculations and generated plurality of outgoing electronic messages to execute a trade until another real order corresponding to one of the plurality of speculative orders is received by the gatekeeper processor;
receive, prior to the first matching engine processor, via the communications network, subsequent to at least the generation of the one of the plurality of speculative orders which corresponds thereto, data indicative of a second real order corresponding to one of the plurality of speculative orders; and
bypass the first matching engine processor and execute a trade between the first real order and the second real order utilizing the calculations and transmitting, via the communications network, the plurality of outgoing electronic messages generated by the additional matching engine processor corresponding to the one of the plurality of speculative orders.

10. The electronic trading system of claim 9, wherein a price of each of the plurality of speculative orders is based on a price of the first real order.

11. The electronic trading system of claim 10, wherein the price of each the plurality of speculative orders differs from the price of the first real order by a multiple of price ticks.

12. The electronic trading system of claim 9, wherein a price of each of the plurality of speculative orders is based on a trend of a market or a trend of a financial instrument underlying the first real order, based on economic indicators, based on a statistical analysis, or based on a scheduled market event or a financial announcement.

13. The electronic trading system of claim 9, wherein each of the plurality of speculative orders differs from another of the plurality of speculative orders by price, quantity and/or type of instrument, each corresponding to potential variation of a real order counter to the first real order which may possibly be received.

14. The electronic trading system of claim 13, wherein the differences between each of the plurality of speculative orders are randomly determined.

15. The electronic trading system of claim 9, wherein a number of speculative orders generated is based on when the second real order is received subsequent to receipt of the first real order.

16. The electronic trading system of claim 9, wherein the plurality of outgoing electronic messages include messages addressed to at least one trading entity, to an exchange, or to a market data server.

17. The electronic trading system of claim 9, wherein the plurality of outgoing electronic messages include messages comprising information related to price or quantity.

18. The electronic trading system of claim 9, wherein each the plurality of additional matching engine processors is part of a grid computing network, a cloud computing network, or a symmetric multiprocessing computer architecture.

19. A computer implemented method comprising:
receiving, by a gatekeeper module implemented by a processor, prior to a first matching engine processor of an electronic trading system, from an input terminal via a communications network, data indicative of a first real order for a financial instrument;
generating, by the gatekeeper module, responsive to a determination that the first real order has not been filled by one or more previously received but unfilled orders counter thereto, a plurality of speculative orders which corresponds to at least one other real order that is counter to the first real order and which is predicted to be, but not yet, received;
dynamically implementing, by the gatekeeper module, based on the generating, at least one of a plurality of additional matching engine processors, wherein each of the plurality of additional matching engine processors operate in parallel and correspond to one of the plurality of speculative orders;

causing, by the gatekeeper module, based on the corresponding one of the plurality of speculative orders, at least one of the plurality of additional matching engine processors to perform at least a portion of calculations involved with matching the first real order with a yet-to-be received corresponding at least one other real order, as if it had been received, and generate a plurality of outgoing electronic messages associated therewith;

preventing, by the gatekeeper module, each of the calculations and generated plurality of outgoing electronic messages from being utilized to execute a trade until another real order corresponding to one of the plurality of speculative orders is received;

receiving, by the gatekeeper module, prior to the first matching engine processor, via the communications network subsequent to at least the generating of the one of the plurality of speculative orders which corresponds thereto, data indicative of a second real order corresponding to one of the plurality of speculative orders; and bypassing, by the gatekeeper module, the first matching engine processor and executing, by the gatekeeper module, a trade based on the second real order and the first real order, the executing comprising utilizing the calculations and transmitting, via the communications network, the plurality of outgoing electronic messages previously generated by the additional matching engine processor corresponding to the one of the plurality of speculative orders.

20. The computer implemented system method of claim 19, wherein a price of each the plurality of speculative orders is based on a price of the first real order.

* * * * *

UNITED STATES PATENT AND TRADEMARK OFFICE
CERTIFICATE OF CORRECTION

| | |
|---|---|
| PATENT NO. | : 12,340,416 B2 |
| APPLICATION NO. | : 17/853225 |
| DATED | : June 24, 2025 |
| INVENTOR(S) | : Stanislav Liberman et al. |

Page 1 of 1

It is certified that error appears in the above-identified patent and that said Letters Patent is hereby corrected as shown below:

In the Claims

Column 12, Claim 20, Line 15:
Please remove the word "system"

Signed and Sealed this
Twenty-ninth Day of July, 2025

Coke Morgan Stewart
*Acting Director of the United States Patent and Trademark Office*